`United States Patent Office`

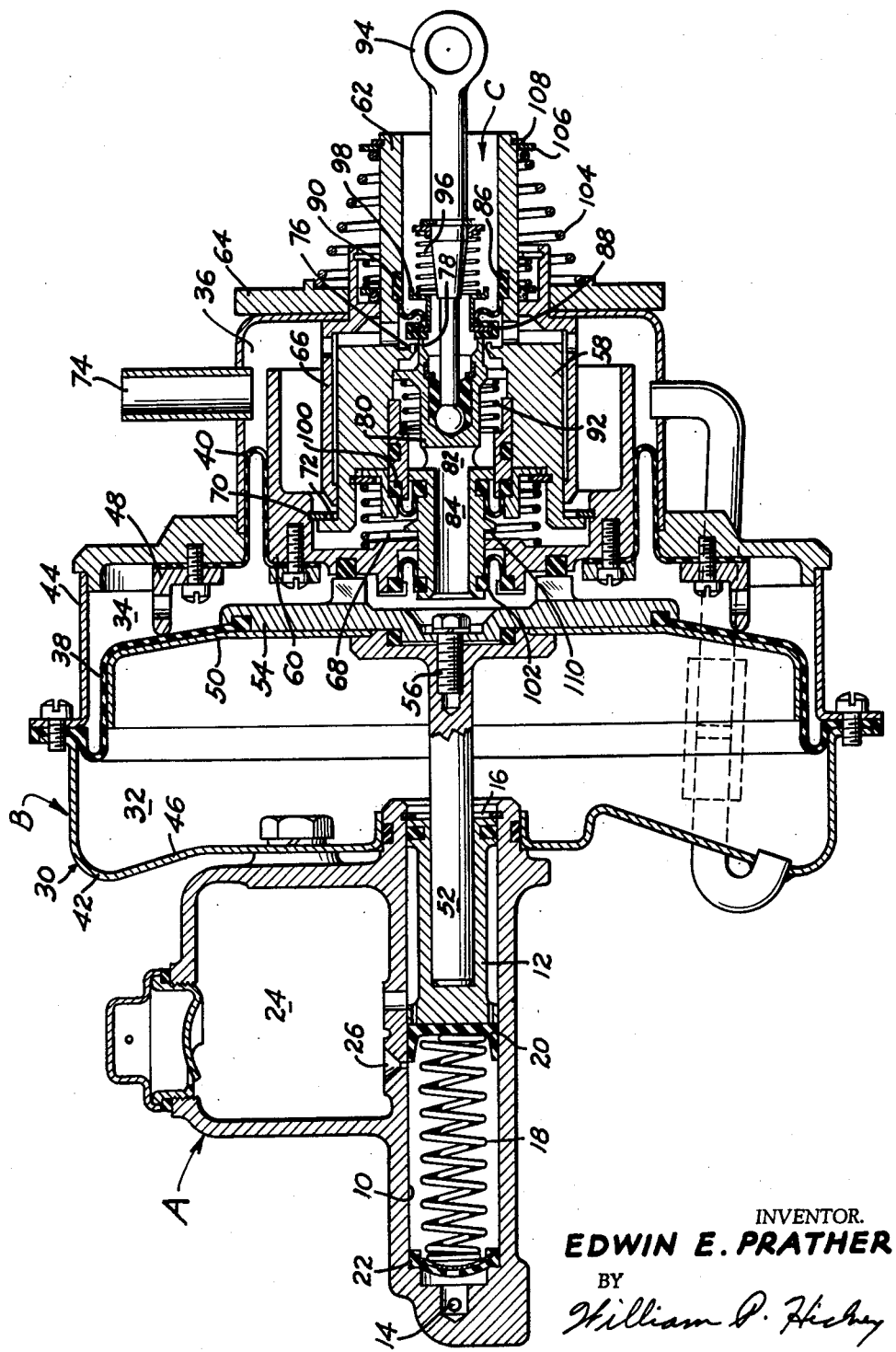

3,075,499
Patented Jan. 29, 1963

3,075,499
SERVOMOTOR WITH NORMALLY STATIONARY
VALVE STRUCTURE
Edwin E. Prather, South Bend, Ind., assignor to The
Bendix Corporation, South Bend, Ind., a corporation
of Delaware
Filed Sept. 16, 1960, Ser. No. 56,584
6 Claims. (Cl. 121—38)

The present invention relates to fluid pressure servo-motors; and more particularly to vacuum actuated fluid pressure servomotors.

An object of the present invention is the provision of a new and improved fluid pressure servomotor for power brakes and the like whose control valve does not provide a follow-up action of its driven elements when power is available to actuate the fluid pressure servomotor, and which actuates the driven elements manually during power failure.

A more particular object of the present invention is the provision of a new and improved fluid pressure servomotor having three axially aligned chambers which are separated by means of a reaction producing movable wall and a power actuated movable wall, the first of which contains a control valve structure for applying pressure between the movable walls, and the servomotor further supplying a lower pressure to the side of the reaction producing movable wall opposite from the power actuated movable wall so that the reaction producing movable wall is biased away from the power actuated movable wall during normal actuation of the unit.

The invention resides in certain constructions and combinations and arrangements of parts; and further objects and advantages of the invention will become apparent to those skilled in the art to which the invention relates from the following description of the preferred embodiment described with reference to the accompanying drawing forming a part of this specification, and in which:

The solitary figure of the drawing is a longitudinal cross sectional view of a vacuum actuated fluid pressure servomotor driven hydraulic master cylinder of the type used to actuate the brakes of automotive vehicles.

The power brake shown in the drawing generally comprises a cast master cylinder A that is bolted to one end of a vacuum actuated fluid pressure servomotor B. The master cylinder A has an axially extending bore 10 having the conventional spool shaped hydraulic piston 12 therein for displacing fluid out of its discharge opening 14 which is normally communicated to the hydraulic braking system of an automotive vehicle. The hydraulic piston 12 is normally biased against a snap ring stop 16 in the end of the bore 10 adjacent the fluid pressure servomotor by a coil spring 18. One end of the coil spring 18 is positioned against the usual cup seal 20 on the inner end of the piston 12, and the other end of the coil spring 18 is biased against the conventional residual pressure check valve structure 22 which is normally biased against its seat on the opposite end wall of the bore 10. The residual pressure check valve structure 22 is of conventional construction; and for a more complete description of its construction and operation, reference may be had to the Maxwell L. Cripe application Serial No. 779,742. The cast housing of the master cylinder A also includes a reservoir 24 of compensating fluid generally positioned in the region overlying the retracted position of the hydraulic piston 12 shown in the drawing, and is provided with a compensating port 26 which communicates the reservoir 24 with the portion of the bore 10 just forwardly (or to the left as seen in the drawing) of the retracted position of the cup seal 20.

The fluid pressure servomotor B generally comprises a housing 30 having an internal chamber which is divided into three opposing power chambers or compartments 32, 34 and 36 by a pair of movable walls or diaphragms 38 and 40. The housing 30 is conveniently made in two flanged cup-shaped sections 42 and 44. The end wall 46 of the section 42 is suitably bolted to the master cylinder A; and because the diaphragm 40, is not required to be of the same size as the diaphragm 38 for the purposes intended, the housing section 44 is stepped inwardly as at 48 so that the section enclosing the chamber 36 is of a reduced diameter.

The movable wall 38 is formed by means of a back-up plate 50 which bears against the headed end of a push rod 52 which drives the piston 12 down its bore 10. The inner end of the diaphragm 38 is sealingly clamped between the back-up plate 50 and a hold-down plate 54 as by the machine screw 56, and the outer end of the diaphragm 38 is sealingly clamped between the flanges of the housing sections 42 and 44. The servomotor unit, B shown, is of a vacuum suspended type in which vacuum is normally communicated to both of the chambers 32 and 34 (and in which the movable wall 38 is caused to actuate the master cylinder A when atmospheric pressure is admitted to the middle power chamber 34.

Flow to the middle power chamber 34 is controlled by means of a servomotor control valve structure C which is generally mounted on and carried by the movable wall structure 40. In some instances the control valve C may be carried directly on the movable wall 40; but inasmuch as it is desired to provide a reaction force on the movable elements of the control valve, the valve structure C is formed within a general tubular valve body 58 that is loosely mounted on the movable wall structure 40. The inner end of the diaphragm 40 is sealingly clamped to a cup-shaped diaphragm hub 60; and the outer end of the diaphragm 40 is sealingly clamped to the stepped portion 48 of the rear housing section 44. Diaphragm 40 is what is generally called a curtain diaphragm, and is so arranged that portions of the diaphragm are folded up against the sidewalls of the chamber 36 and the outer surface of the hub section 60.

The tubular valve body 58 has a small diameter section 62 which extends through the rear end wall 64 of the servomotor unit and is guided for axially inward movement by means of a barrel-shaped guide 66 which is sealed to the end wall 64 and which has a suitable sliding seal with respect to the small diameter section 62 of the valve body member 58. The diaphragm hub 60 and the valve body member 58 are biased axially apart by a counter reaction spring 68; and separation of the hub and valve body is prevented by means of a snap ring 70. In the normal condition of the servomotor shown in the drawing, the valve body 58 is in operative abutment with the rear end wall 64 of the servomotor unit through the barrel-shaped guide 66 to provide a suitable return stop means; and the snap ring 70 is held into engagement with a radially outwardly extending flange 72 of the valve body by the counter reaction spring 68, so as to hold the hub section 60 in the position shown in the drawing when the servomotor is in its de-energized condition. In the normal de-energized condition, vacuum is continually communicated to the rear opposing chamber 36 through the vacuum inlet 74; and this vacuum is normally communicated to the power chamber 34 through the control valve structure C which will later be described in detail. Vacuum of the same intensity therefore is normally communicated to both of the opposing chambers 34 and 36 so that the hub section 60 assumes generally the position shown in the drawing.

The control valve structure C is what is generally known as a single poppet valve; and generally comprises a stationary vacuum valve seat 76 formed by a radially inwardly extending projection on the inside of the valve body, and a movable atmospheric valve seat 78 formed on the outer end of an axially extending control member 80. The atmospheric valve seat 78 is positioned generally concentric and inwardly of the vacuum valve seat 76 so that a control pressure established by flow past the several valve seats may flow therebetween and forwardly around the control member 80 to a transverse passage 82 in the control member 80 and thence to the power chamber 34 by means of an axially extending drilling 84. Air flow past the valve seats 76 and 78 is controlled by a rubber poppet member 86 which has a stiffened flange portion 88 that is adapted to abut the valve seats 76 and 78, and a diaphragm portion 90 which is suitably sealed with respect to the inner sidewalls of the tubular valve body 58 outwardly of the vacuum valve seat 76. The outer end of the tubular valve body 58 is always open to the atmosphere so that air is free to flow through the annular rubber poppet member 86 to the atmospheric valve seat 78. In the normal condition of the valve, valve return spring 92 biases the valve seat 78 outwardly into sealing engagement with the annular poppet member 86 to close off the atmospheric valve seat and open the vacuum valve seat 76. Vacuum is continually communicated to the region between the vacuum valve seat 76 and poppet member 86 from the rear opposing chamber 36 by means of suitable openings in the guide 66 and tubular valve body 58. In the normal de-energized condition of the servomotor therefore, vacuum is communicated around the poppet member 80 and through its passages 82 and 84 to the power chamber 34, thereby establishing vacuum of the same intensity in both of the chambers 34 and 36.

The control member 80 is adapted to be actuated by means of a push rod 94 which is normally pivoted to the brake pedal, not shown, of an automotive vehicle. Inward movement of the push rod 94 causes the atmospheric valve seat 78 to move inwardly so as to permit the poppet member 86 to come into abutment with the vacuum valve seat 76. Inasmuch as atmospheric pressure exists on the outside of the poppet member 86 while its inner surface is subjected to vacuum, the poppet member 86 will normally be held into engagement with the vacuum valve seat 78; and in order to insure that the poppet member will properly seal with respect to the valve seats 76 and 78, a light coil spring 96 is suitably interpositioned between the push rod 94 and a thimble 98 which bears up against suitable stiffening structure for the poppet member. Continued inward movement of the control member 80 after the poppet member 86 has abutted the vacuum valve seat 76 causes the atmospheric valve seat 78 to move out of engagement with respect to the poppet member 86 to thereby permit atmospheric pressure to flow around the control member and into the power chamber 34. It will be seen that the inner end of the control member 80 in effect passes through the outer vacuum chamber 36, and a suitable pressure seal is provided between the control member 80 and the valve body 58 and diaphragm hub structure 60 respectively by means of diaphragm seals 100 and 102.

In the normal condition of the servomotor, the valve body 58 is held into abutment with the rear surface of the guide 66 by means of a coil spring 104 which is suitably interpositioned between the end surface of the servomotor and a stop washer 106 that is retained on the valve body by means of a snap ring 108. The inward movement of the control member 80, previously described, raises the pressure in the power chamber 34 to bias the diaphragm 38 forwardly, while at the same time biasing the diaphragm 40 rearwardly towards the end wall 64 of the servomotor. Forward movement of the diaphragm 38 causes the lips of the seal 20 to slide over and close off compensating port 26; whereupon the fluid which is confined in the inner end of the bore 10 is forced through the openings in the residual pressure check valve 22 to the hydraulic braking system of the vehicle which is attached to the outlet 14 of the master cylinder. Once the demand for fluid in the braking system is met and pressure builds up in the bore 10, motion of the diaphragm 38 ceases. Thereafter the pneumatic pressure in the chamber 34 continues to increase sufficiently to overcome the counterreaction spring 68 and thereby allow the diaphragm hub 60 to move rearwardly into abutment with the flange 110 of the control member 80. Thereafter force on the hub 60 is applied to the control member 80 causing it to move rearwardly by an amount which brings the atmospheric valve seat 78 again into abutment with the poppet member 86 to close off the further flow of air into the power chamber 34. In this position of the valve structure, both the atmospheric valve seat 78 and the vacuum valve seat 76 abut the valve closure poppet 86 to produce what is known in the art as a "lapped position" of the valve in which all flow through the valve is prevented. If the operator desires to increase the amount of braking effort that is being achieved, he applies greater pressure to the push rod 94 to cause the atmospheric valve seat 78 to move inwardly away from the poppet member 86 by a few thousandths of an inch and thereby allow further flow of air to the power chamber 34. This build up of air pressure in the power chamber 34 not only causes a greater force to be delivered against the power diaphragm 38 to achieve a greater braking effort, but also causes a greater force to be delivered against the diaphragm 40 to oppose the operator's effort and again cause the atmospheric valve seat 78 to move into engagement with the poppet member 86. If the operator desires to reduce the braking effort which is being developed, a reduction in pressure on the push rod 94 permits the diaphragm 40 to force the atmospheric valve seat 78 rearwardly to lift the poppet member 86 off of the vacuum valve seat 76 and communicate vacuum to the power chamber 34. A reduction in pressure is thereby produced in the power chamber 34—permitting the pressure in the hydraulic braking system to move the piston 12 and power diaphragm 38 rearwardly. At the same time the force on the diaphragm 40 is reduced, and this reduction in pressure continues until the force being applied to the push rod 94 by the operator will again move the poppet 86 into abutment with the vacuum valve seat 76. Further change in pressure in the power chamber 34 is then prevented, and a braking effort proportional to the force being applied by the operator is held in the braking system. If the operator desires to completely release his brakes, a removal of force on the push rod 94 permits the pressure in the chamber 34, coupled with the force developed by the coil spring 92, to bias the atmospheric valve seat 78 into engagement with the poppet member 86 and hold it out of engagement with the vacuum valve seat 76, to thereby again establish the normal de-energized condition of the servomotor shown in the drawing.

One of the features of the servomotor above described is that the valve body 58 does not move during the normal operation of the servomotor when power is available to operate the diaphragm 38. It will be observed that in the operation described, the pressure that is delivered to the power chamber is also delivered against the diaphragm 40 to hold the valve body 58 into operative abutment with the rear end wall 64 of the servomotor unit. This provides a normal condition in which no follow up movement of the control member 80 with respect to the power piston 30 occurs; so that the control lever which actuates the unit stays essentially in a constant position. It is a further feature of the servomotor shown in the drawing, that it can be operated manually upon power failure to manually drive the power piston 38 and the hydraulic piston 12 forwardly to operate the brakes of the vehicle. When a vacuum failure occurs, atmospheric pressure develops in all of the opposing chambers 32, 34 and 36. When the operator desires to apply the brakes thereafter, force applied to the push rod 94 is unopposed by the diaphragm 40 so that the abutment 110 engages the hub 60. The force that is applied to the hub 60 is now unopposed by differential pressure across the diaphragm 40, and so the forces applied to the hub 60 causes it to bear against the hold down plate 54 of the diaphragm structure 38, and thereby force the hydraulic piston 12 into its receiving bore 10 to actuate the brakes in the same manner as previously described. It will be seen that the force that is applied to the push rod 94 during power failure therefor causes it to physically move the hydraulic piston 12 and thereby provide a follow-up movement of the actuating structure (valve body 58 and control member 94) with respect to the driven structure including hydraulic piston 12. This type of movement wherein the manually actuated member follows the driven structure to give an indication of the displacement of the driven structure is known as "follow-up" movement by the art.

While the invention has been described in considerable detail, I do not wish to be limited to the particular constructions shown and described; and it is my intention to cover hereby all novel adaptations, modifications, and arrangements thereof which come within the practice of those skilled in the art to which the invention relates and which come within the purview of the following claims.

I claim:

1. In a fluid pressure servomotor: a housing having a generally axially extending chamber having a generally fixed end wall; a first movable wall axially spaced apart from said end wall and forming a first low pressure chamber therebetween; a second movable wall axially spaced on the opposite side of said first movable wall from said end wall and forming a power chamber between said movable walls, said first movable wall being movable toward said second movable wall; a second low pressure chamber on the side of said second movable wall opposite said first movable wall; a tubular projection on said first movable wall projecting through said fixed end wall and movably sealed with respect thereto; means for communicating a source of low pressure to said first low pressure chamber; stop means for limiting movement of said first movable wall toward said end wall; control valve means mounted on and carried by said first movable wall, said control valve means having a control member which when moved toward said second movable wall communicates high pressure to said power chamber; and abutment means operatively positioned between said control member and said second movable wall for driving said second movable wall when insufficient pressure differential exists across said first movable wall to hold it against said stop means; whereby said first movable wall remains stationary when high pressure is admitted to said power chamber and whereby said control member physically actuates said second movable wall when substantially no pressure differential exists across said first movable wall.

2. In a fluid pressure servomotor: a housing having a generally axially extending chamber having a generally fixed end wall; a first movable wall axially spaced apart from said end wall and forming a first low pressure chamber therebetween; a second movable wall axially spaced on the opposite side of said first movable wall from said end wall and forming a power chamber between said movable walls, said first movable wall being movable into abutment with said second movable wall; a second low pressure chamber on the side of said second movable wall opposite said first movable wall; a valve body having a tubular projection extending through said fixed end wall and movably sealed with respect thereto; means for communicating a source of low pressure to said first low pressure chamber; first abutment means for limiting movement of said valve body toward said end wall; means normally biasing said valve body toward said fixed end wall until stopped by said first abutment means; a control member in said valve body, said control member having a lap position in which change in differential pressure across said second movable wall is prevented and an actuating position spaced toward said second movable wall from said lap position for producing a higher pressure in said power chamber than in said second low pressure chamber; and second abutment means for transferring force between said first movable wall and said control member when said control member is in its lap position and opposing actuating movement of said control member from said lap position; whereby said first movable wall provides "reaction" to said control member and "follow up" of said second movable wall by said control member is avoided when differential pressure is available to actuate said servomotor.

3. In a fluid pressure servomotor: a housing having a generally axially extending chamber having a generally fixed end wall; a first movable wall axially spaced apart from said end wall and forming a first low pressure chamber therebetween; a second movable wall axially spaced on the opposite side of said first movable wall from said end wall and forming a power chamber between said movable walls, said first movable wall being movable into abutment with said second movable wall; a second low pressure chamber on the side of said second movable wall opposite said first movable wall; a valve body having a tubular projection extending through said fixed end wall and movably sealed with respect thereto; means for communicating a source of low pressure to said first low pressure chamber; first abutment means for limiting movement of said valve body toward said end wall; means normally biasing said valve body toward said fixed end wall until stopped by said first abutment means; a control member in said valve body, said control member having a lap position in which change in differential pressure across said second movable wall is prevented and an actuating position spaced toward said second movable wall from said lap position for producing a higher pressure in said power chamber than in said second low pressure chamber; second abutment means for transferring force between said first movable wall and said control member when said control member is in its lap position and opposing actuating movement of said control member from said lap position; and a spring biasing said first movable wall away from said valve body; whereby said spring yields after a predetermined pressure differential across said first movable wall is developed to transmit reaction to said control member, and whereby "follow up" of said second movable wall by said control member is avoided when fluid pressure exists in said power chamber.

4. In a fluid pressure servomotor: a movable valve body, a first movable wall for providing reaction, and a second movable wall for power operating a driven device all spaced apart in said order, means including stop means for limiting movement of said valve body away from said first movable wall and normally holding said valve body in its stopped position, a control member in said valve body having a normal position relative to said valve body for equalizing pressure across said second movable wall and an actuated position spaced toward said second movable wall from said normal position for increasing the pressure between said movable walls above that on the opposite sides of said movable walls, means permitting operative abutment of said first movable wall against said control member to provide a reaction against said control member when pressure is communicated to between said movable walls, spring means positioned between said first movable wall and said valve body normally preventing operative abutment between said first movable wall and said control member until a predetermined actuating pressure is communicated to between said movable walls, and said valve body and first movable wall being movable toward said second movable wall by said control member to actuate said second movable wall directly when said control member is actuated and pressure is not available to be communicated to between said movable walls.

5. In a fluid pressure servomotor: a housing having a generally axially extending chamber having a generally fixed end wall; a first movable wall axially spaced from said end wall; a second movable wall axially spaced on the opposite side of said first movable wall from said end wall and forming a power chamber between said movable walls whereby pressure in said power chamber forces said movable walls apart; stop means for limiting movement of said first movable wall towards said end wall; control valve means carried by said first movable wall, said control valve means having a control valve member which abuts said first movable wall when it is moved toward said second movable wall to communicate high pressure to said power chamber; and abutment means operatively positioned between said control member and said second movable wall for driving said second movable wall when insufficient pressure differential exists across said first movable wall to hold it against said stop means; whereby the pressure forces on said first movable wall normally oppose actuation of said control member and said first movable wall remains generally stationary adjacent said end wall during power actuation of said servomotor, and whereby said control member physically actuates said second movable wall when insufficient pressure differential exists across said first movable wall to hold said first movable wall against said stop means.

6. In a fluid pressure servomotor unit: a housing having an axially extending internal chamber, an output member movable in one axial direction, a power operated member in said internal chamber for driving said output member in said axial direction, an axially movable control valve structure positioned on the opposite side of said power operated member from said output member, said control valve structure having an axially extending control member which is moved toward said power operated member to power actuate said power operated member toward said output member, said control member being arranged to operatively abut and drive said power operated member during power failure, a manually actuated member connected to said control member and spaced on the opposite side of said control valve structure from said power operated member, means forming an expansible fluid pressure chamber operatively positioned between said manually actuated member and said power operated member which increases the distance between said manually actuated member and said power operated member during power operation of said servomotor to preclude follow-up of said output member by said manually actuated member, said expansible chamber being filled with a pressure that is generally proportional to the output pressure of said control valve whereby follow-up of said power operated member by said manually actuated member is precluded during at least a portion of the power operation of said unit.

References Cited in the file of this patent
UNITED STATES PATENTS

| | | |
|---|---|---|
| 2,331,238 | Schnell | Oct. 5, 1943 |
| 2,745,383 | Hupp | May 15, 1956 |
| 2,818,710 | Price | Jan. 7, 1958 |
| 2,883,971 | Ayers | Apr. 28, 1959 |
| 2,949,892 | Ayers | Aug. 23, 1960 |
| 2,953,120 | Ayers | Sept. 20, 1960 |
| 2,976,846 | Stelzer | Mar. 28, 1961 |